Sept. 7, 1943. C. A. RICH 2,328,676
ROLL NECK BEARING
Filed March 17, 1942 2 Sheets-Sheet 2

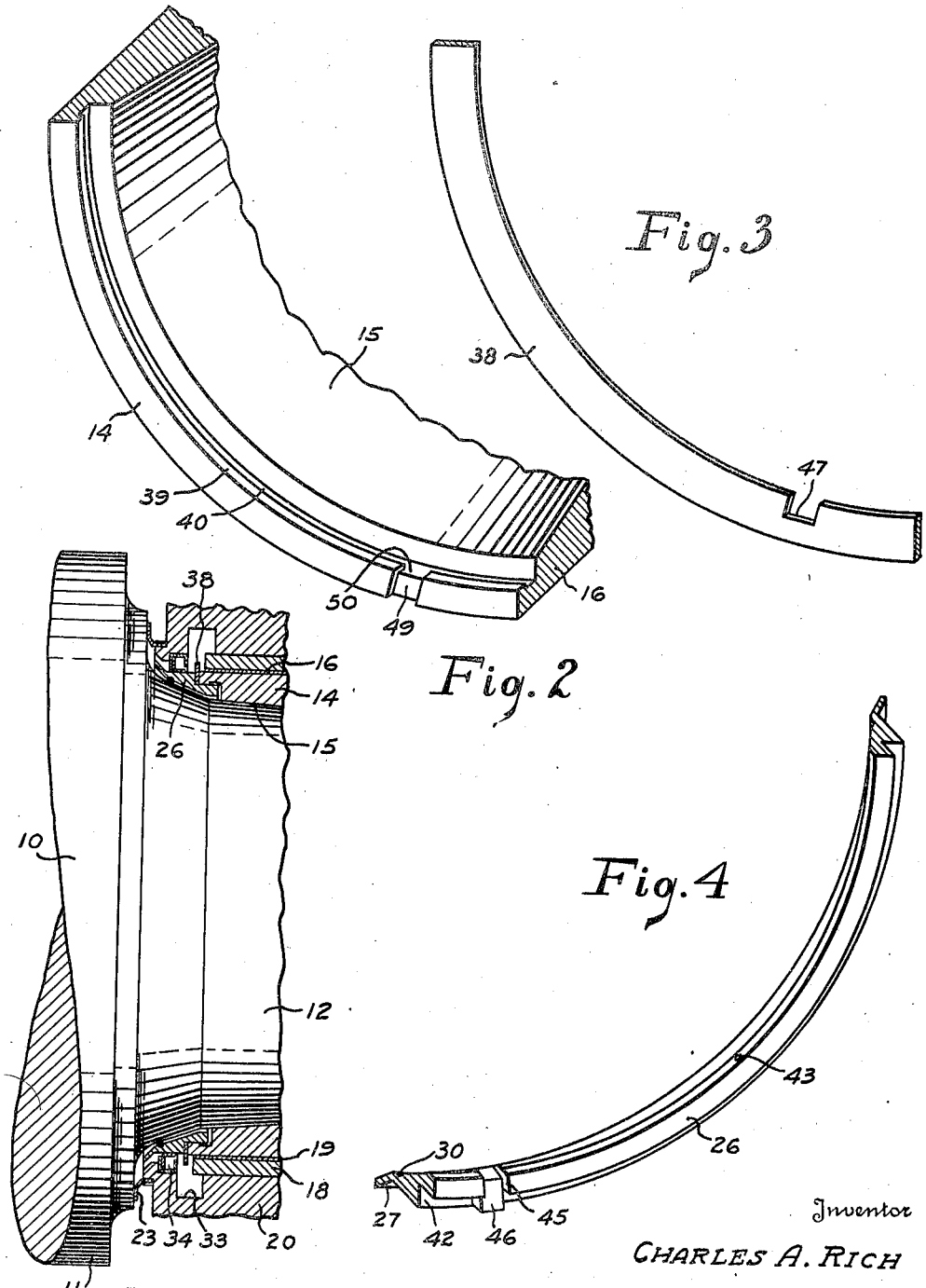

Inventor
CHARLES A. RICH
By Albert G. Blodgett
Attorney

Patented Sept. 7, 1943

2,328,676

UNITED STATES PATENT OFFICE 2,328,676

ROLL NECK BEARING

Charles A. Rich, Worcester, Mass., assignor to Morgan Construction Company, Worcester, Mass., a corporation of Massachusetts Application March 17, 1942, Serial No. 435,036

6 Claims. (Cl. 308—36.1)

This invention relates to roll neck bearings, and more particularly to bearings of the oil film type as disclosed in the United States Patent to Dahlstrom No. 2,018,055, granted October 22, 1935.

Such bearings are utilized to support the rolls in mills for rolling metal bars, sheets and the like. These rolls are usually sprayed with water which flows over the ends of the roll barrel and carries along considerable quantities of scale from the rolling operation. It is very important to exclude this water and scale from the bearings and prevent contamination of the lubricating oil. It is also important to collect the oil which has circulated through the bearings and prevent appreciable loss or leakage thereof.

The present invention has for its principal object the provision of an improved construction of seals and associated parts for the inboard end of an oil film roll neck bearing, which will be highly effective in excluding water and scale and in avoiding escape of oil.

It is a further object of the invention to provide a sealing construction for the inboard end of a roll neck bearing, which will be comparatively simple and inexpensive to manufacture and assemble.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts:

Fig. 1 is a small-scale longitudinal section through the inboard portion of a roll neck bearing, shown mounted upon the roll;

Fig. 2 is a fragmentary perspective view of the bearing sleeve;

Fig. 3 is a fragmentary perspective view of an annular oil flinger;

Fig. 4 is a fragmentary perspective view of an annular water flinger;

Figure 5:
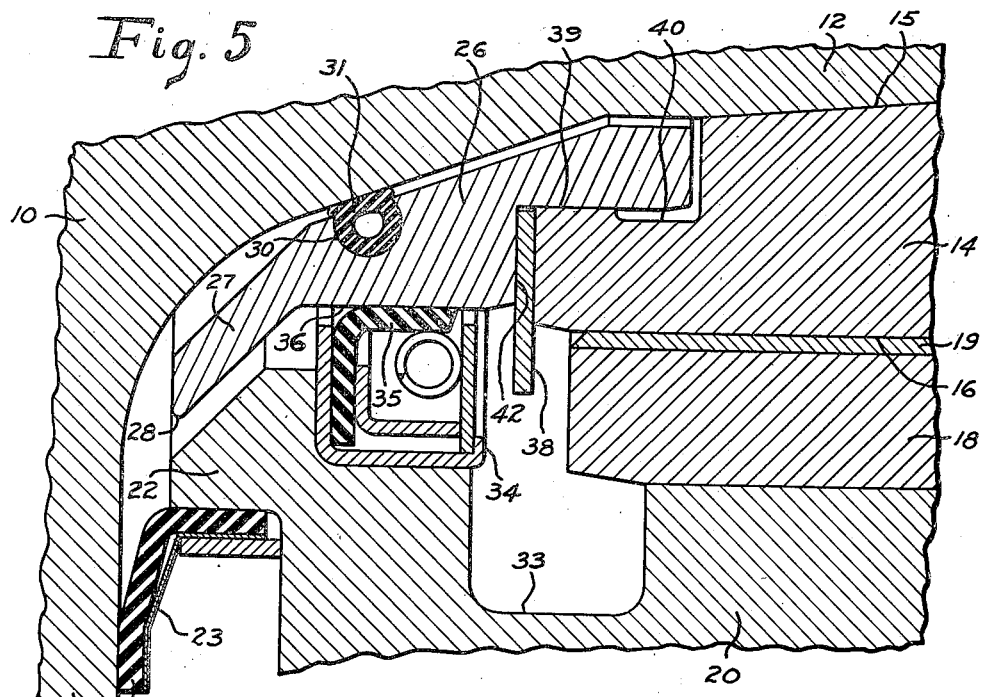
Fig. 5 is an enlarged view of a portion of Fig. 1, showing the parts in greater detail.

The embodiment illustrated comprises a rolling mill roll 10 having a barrel 11 and a tapered neck 12. A sleeve 14 is secured to the neck 12 to rotate therewith, this sleeve having a tapered bore 15 which fits the neck closely and a cylindrical outer bearing surface 16. The sleeve 14 is surrounded by a stationary cylindrical bushing 18 having a lining 19 of a suitable bearing metal. The bushing 18 is mounted in a chock or casing 20. It will be understood that the sleeve 14 has a running fit within the lining 19, and that during the operation of the bearing oil is supplied continuously to the bearing surfaces by suitable means. As so far described the various parts may be of the general construction disclosed in the above-mentioned Dahlstrom patent.

Water and scale from the rolling operation will flow over the end of the roll barrel 10, and it is very important to exclude such material from the bearing. For this purpose the inboard end of the chock 20 is provided with an annular rib or flange 22, as shown particularly in Fig. 5. An annular sealing device 23 is mounted on the outer surface of the rib 22, this device including a member 24 of the flexible material and L-shaped cross section adapted to engage the adjacent end of the roll barrel. For further details of this construction reference may be had to my prior Patent No. 2,231,947, granted February 18, 1941.

In the operation of the rolling mill small quantities of water may find their way inwardly between the end of the roll barrel and the sealing member 24. Such water must be removed and prevented from contaminating the lubricating oil. For this purpose an annular member 26 is mounted on the inboard end of the sleeve 14, this member being shaped to provide a flange 27 which flares radially outward toward the sealing element 23. The outer corner 28 of this flange has a diameter greater than that of the sleeve 14 (see Fig. 5). The inner surface of the member 26 is provided with a groove 30 within which a gasket 31 is mounted to engage the roll neck 12 at assembly. This gasket is preferably in the form of a tube of rubber or similar yieldable material. The gasket 31 will prevent water from entering the bearing through the space between the roll neck and the member 26. The flange 27 will serve as a flinger to throw outwardly any water which finds its way inwardly past the seal 23.

The lubricating oil which is delivered to the bearing forms a film of oil between the outer surface of the sleeve 14 and the inner surface of the bearing liner 19. Oil is continually escaping in the endwise direction from between these surfaces, and it is necessary to collect this oil so that it may be recirculated. For this purpose the interior of the chock 20 is provided with a recess in the form of an annular channel 33 which is located adjacent the inboard end of the bushing 18, in position to receive the escaping oil. This channel is connected with a pipe or other conduit (not shown) through which the oil may return by gravity to the main oil tank or reservoir. In order to confine this oil in a desired manner, an annular sealing device 34 is mounted within the chock 20 at the inboard side of the channel 33. This device 34 may be of any suitable and well-known construction, and as illustrated it includes a member 35 of flexible material and L-shaped cross section. The inner lip or branch of the member 35 extends in the outboard direction and its inner surface is in contact with a cylindrical surface 36 on the outside of the member 26.

Figure 6:
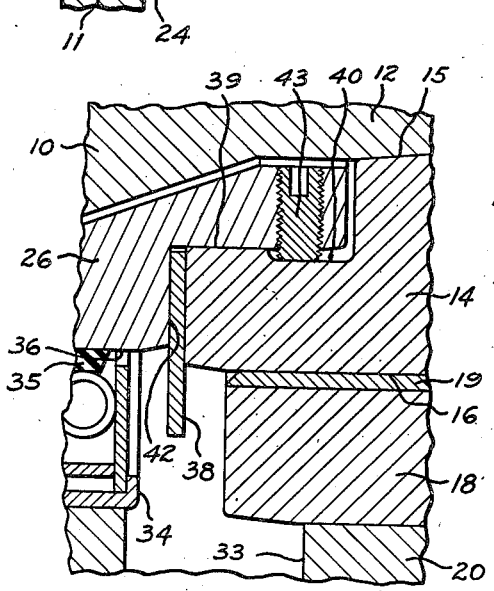
Fig. 6 is a view similar to Fig. 5, the section being taken in a different radial plane.
Figure 7:
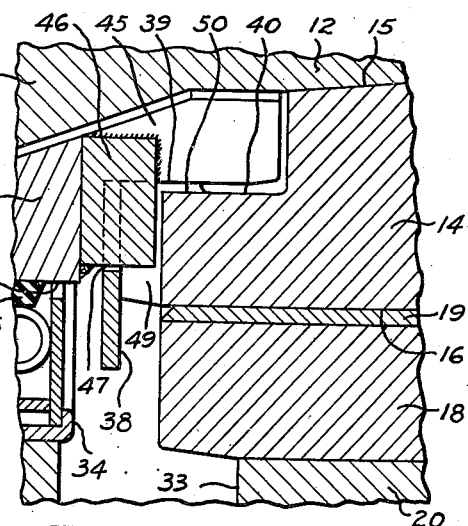
Fig. 7 is a view similar to Fig. 6, the section being taken in a still different radial plane.

One important feature of the invention resides in the provision of means to minimize, so far as possible, the amount of oil which is allowed to reach the seal 34. For this purpose there is shown a comparatively thin flat ring 38 arranged to serve both as an oil baffle and as an oil flinger. This ring is aligned with the oil-receiving groove 33 and rotates with the sleeve 14, its outside diameter being greater than that of the sleeve. The ring 38 is held in place between the adjacent end portions of the sleeve and the member 26, the latter being shaped to provide a ship-lap joint with the sleeve. Preferably the inboard end of the sleeve is formed with a counterbore 39 having an annular relief groove 40 spaced from the said end. The outboard end of the member 26 is reduced in diameter to fit closely within the counterbore 39 and to provide a shoulder 42 which engages the ring 38 and holds it against the end of the sleeve 14. A setscrew 43 (Fig. 6) of the headless type extends radially through the reduced portion of the member 26 and into the groove 40. There are preferably three or more of these setscrews, spaced about the circumference. In order to ensure positive rotation of the member 26 and ring 38 with the sleeve 14, these parts are keyed together. As shown in Fig. 4, a notch 45 is provided in the outboard end of the member 26, and a block or key 46 is secured in this notch, preferably by welding. Also, a notch 47 (Fig. 3) is formed in the inner portion of the ring 38, and a notch 49 (Fig. 2) is formed in the inboard end of the sleeve 14, the inner end of this notch 49 preferably communicating with the groove 40 through a shallow channel 50. When the parts are assembled as shown in Fig. 7, the key 46 extends through the notch 47 in the ring and into the notch 49 in the sleeve, thereby preventing relative rotation of these parts.

The operation of the invention will now be apparent from the above disclosure. Oil will be supplied to the bearing continuously by a suitable pump to maintain a film of oil between the outside of the sleeve 14 and the lining 19. Some of this oil will be discharged endwise against the ring 38 and be thrown outwardly by centrifugal force into the groove 33, whence it will drain back by gravity to the oil reservoir for further circulation. Because of the ring 38, very little oil will reach the seal 34, and substantially no oil will escape past the same. Since the clearance space between the annular member 26 and the roll neck 12 communicates with the groove 33 through the channel 50 and notch 49, as shown in Fig. 7, there can be no accumulation of oil under pressure in this space. The seal 23 will exlude water and scale, and if any water does enter past this seal and reach the gasket 31 its further progress will be blocked and it will be thrown outwardly by the centrifugal action of the flange 27 and escape at the bottom of the bearing, the seal 23 preferably having a gap at that point as disclosed in my prior Patent No. 2,231,947. The construction is comparatively simple and inexpensive to manufacture and highly effective for the purpose intended.

Having thus described my invention, what I claim as new and desire to secure by Letters Patent is:

1. A roll neck bearing comprising a sleeve adapted to be removably mounted on a roll neck and having a cylindrical outer surface, a casing surrounding the sleeve and arranged to maintain a film of oil in contact with the said cylindrical surface to support the sleeve for rotation, an annular sealing device mounted on the inboard end of the casing and adapted to engage the adjacent face of the roll barrel to exclude water from the bearing, an annular member secured to the inboard end of the sleeve and having an outwardly extending flange adapted to fling outwardly water which may enter past the sealing device, the casing having a recess therein arranged to receive oil which escapes endwise along the sleeve, and an annular sealing device mounted in the casing and engaging the outer surface of the annular member between the flange and the recess.

2. A roll neck bearing comprising a sleeve adapted to be removably mounted on a roll neck and having a cylindrical outer surface, a casing surrounding the sleeve and arranged to maintain a film of oil in contact with the said cylindrical surface to support the sleeve for rotation, an annular sealing device mounted on the inboard end of the casing and adapted to engage the adjacent face of the roll barrel to exclude water from the bearing, an annular member secured to the inboard end of the sleeve and having an outwardly extending flange adapted to fling outwardly water which may enter past the seal, an annular gasket of yieldable material secured within the annular member and adapted to engage the roll neck at assembly, the casing having a recess therein arranged to receive oil which escapes endwise along the sleeve, and an annular sealing device mounted in the casing and engaging the outer surface of the annular member between the flange and the recess.

3. A roll neck bearing comprising a sleeve adapted to be removably mounted on a roll neck and having a cylindrical outer surface, a casing surrounding the sleeve and arranged to maintain a film of oil in contact with the said cylindrical surface to support the sleeve for rotation, a separate annular member secured to the inboard end of the sleeve, the casing having a recess therein arranged to receive oil which escapes endwise along the sleeve, a ring secured to the inboard end of the sleeve and in alignment with the recess, the ring having a greater outside diameter than the sleeve and being arranged to serve as an oil baffle and oil flinger, and an annular sealing device mounted in the casing at the inboard side of the recess and engaging the outer surface of the said annular member.

4. A roll neck bearing comprising a sleeve adapted to be removably mounted on a roll neck and having a cylindrical outer surface, a casing surrounding the sleeve and arranged to maintain a film of oil in contact with the said cylindrical surface to support the sleeve for rotation, an annular member connected to the inboard end of the sleeve with a ship-lap joint, a ring mounted between the adjacent ends of the sleeve and the annular member, the ring having an outside diameter exceeding that of the sleeve, the casing having a recess therein aligned with the ring and arranged to receive oil which is thrown off by the ring, and an annular sealing device positioned between the annular member and the casing at the inboard side of the said recess.

5. A roll neck bearing comprising a sleeve adapted to be removably mounted on a roll neck and having a cylindrical outer surface, a casing surrounding the sleeve and arranged to maintain a film of oil in contact with the said cylindrical surface to support the sleeve for rotation, the inboard end of the sleeve having a counterbore, an annular member having its outboard end reduced in diameter to enter the counterbore and to provide a shoulder, a flat ring mounted between the said shoulder and the adjacent end of the sleeve, the ring having an outside diameter exceeding that of the sleeve, the casing having a recess therein aligned with the ring and arranged to receive oil which is thrown off by the ring, and an annular sealing device positioned between the annular member and the casing at the inboard side of the said recess.

6. A roll neck bearing comprising a sleeve adapted to be removably mounted on a roll neck and having a cylindrical outer surface, a casing surrounding the sleeve and arranged to maintain a film of oil in contact with the said cylindrical surface to support the sleeve for rotation, an annular member connected to the inboard end of the sleeve with a ship-lap joint, a ring mounted between the adjacent ends of the sleeve and the annular member, the ring having an outside diameter exceeding that of the sleeve, the casing having a recess therein aligned with the ring and arranged to receive oil which is thrown off by the ring, a key arranged to prevent relative rotation of the sleeve, ring and annular member, and an annular sealing device positioned between the annular member and the casing at the inboard side of the said recess.

CHARLES A. RICH.